United States Patent
Dhawan et al.

(10) Patent No.: US 7,761,503 B2
(45) Date of Patent: Jul. 20, 2010

(54) PEER DISTRIBUTION POINT FEATURE FOR SYSTEM MANAGEMENT SERVER

(75) Inventors: Gaurav R Dhawan, Redmond, WA (US); David C James, Bothell, WA (US); Nirupama Chandrasekaran, Seattle, WA (US); Rajagopalan Badri Narayanan, Redmond, WA (US); Ingo R. A. G. Bringemeier, Issaquah, WA (US); John L Ellis, Sammamish, WA (US); Michael Healy, Redmond, WA (US); Khuzaima Iqbal, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 934 days.

(21) Appl. No.: 11/326,773

(22) Filed: Jan. 6, 2006

(65) Prior Publication Data

US 2007/0162541 A1    Jul. 12, 2007

(51) Int. Cl.
*G06F 15/16* (2006.01)
*G06F 9/44* (2006.01)
*G06F 9/445* (2006.01)

(52) U.S. Cl. .............. 709/203; 709/201; 709/202; 717/172; 717/173; 717/174; 717/175; 717/176; 717/177; 717/178

(58) Field of Classification Search ......... 709/201–203; 717/173–178, 103, 172
See application file for complete search history.

(56) References Cited

U.S. PATENT DOCUMENTS 6,067,582 A * 5/2000 Smith et al. ............... 710/5

| | | | |
|---|---|---|---|
| 6,117,188 A * | 9/2000 | Aronberg et al. | 717/176 |
| 6,141,754 A | 10/2000 | Choy | |
| 6,237,020 B1 * | 5/2001 | Leymann et al. | 709/201 |
| 6,282,711 B1 * | 8/2001 | Halpern et al. | 717/175 |
| 6,487,718 B1 * | 11/2002 | Rodriguez et al. | 717/177 |

(Continued)

FOREIGN PATENT DOCUMENTS

EP         1304847 A2    4/2003

(Continued)

OTHER PUBLICATIONS

"HP System Management Homepage—HP-UX," ©2005 Hewlett-Packard Development Company, L.P., <http://h20293.www2.hp.com/portal/swdepot/displayProductInfo.do?productNumber=SysMgmtWeb>.

(Continued)

*Primary Examiner*—Jefferey F Harold
*Assistant Examiner*—Kai J Chang
(74) *Attorney, Agent, or Firm*—Workman Nydegger

(57) ABSTRACT

A client in a plurality of clients with a same network address or similar common identifier is designated a Peer Distribution Point (PDP) agent for distributing a software application divided into several packages to the plurality of clients. The plurality of clients are part of a client-server hierarchical system comprising a Central SMS site server and several Distributing servers. The Central SMS site server generates policies for the packages that are pushed to a Distribution server assigned to the plurality of clients from where the PDP agent pulls the policies. The Central SMS site server generates the packages that are pushed to the Distributing server after the PDP agent pulls the policies. The packages are pulled by the PDP agent from the Distributing server. The other clients pull the packages from the PDP agent as and when needed.

16 Claims, 11 Drawing Sheets

U.S. PATENT DOCUMENTS

| | | | |
|---|---|---|---|
| 6,510,466 B1 | 1/2003 | Cox et al. | |
| 6,523,166 B1* | 2/2003 | Mishra et al. | 717/174 |
| 6,718,361 B1* | 4/2004 | Basani et al. | 709/201 |
| 6,721,793 B1 | 4/2004 | Corless | |
| 6,760,761 B1* | 7/2004 | Sciacca | 709/220 |
| 6,910,052 B2 | 6/2005 | Gates | |
| 7,379,967 B2* | 5/2008 | Izutsu et al. | 709/204 |
| 7,512,943 B2* | 3/2009 | Hester et al. | 717/177 |
| 2002/0032763 A1* | 3/2002 | Cox et al. | 709/223 |
| 2003/0009587 A1* | 1/2003 | Harrow et al. | 709/238 |
| 2003/0018763 A1 | 1/2003 | Doherty et al. | |
| 2003/0187853 A1 | 10/2003 | Hensley et al. | |
| 2003/0232616 A1* | 12/2003 | Gidron et al. | 455/406 |
| 2004/0107242 A1 | 6/2004 | Vert | |
| 2004/0199667 A1* | 10/2004 | Dobbins | 709/240 |
| 2005/0160420 A1* | 7/2005 | Kruta et al. | 717/174 |
| 2006/0277092 A1* | 12/2006 | Williams | 705/10 |

FOREIGN PATENT DOCUMENTS

| | | |
|---|---|---|
| JP | 2004-38872 A | 2/2004 |
| WO | WO 00/10071 A1 | 2/2000 |
| WO | 0229551 | 4/2002 |
| WO | WO 2005/052786 A2 | 6/2005 |

OTHER PUBLICATIONS

"IBM SecureWay Host On-Demand 4.0: Enterprise Communications in the Era of Network Computing," Abstract, Mar. 6, 2000, <http://www.redbooks.ibm.com/abstracts/SG242149.html?Open>.

"Installer Step-Up Utility for MS Systems Management Server," ©2005 Microsoft Corporation, <http://www.microsoft.com/technet/prodtechnol/sms/sms2/confeat/instlset.mspx>.

* cited by examiner

PEER DISTRIBUTION POINT FEATURE FOR SYSTEM MANAGEMENT SERVER

BACKGROUND

In order to electronically distribute a software application to a plurality of destinations, the software application is often divided into one or more software application packages. The software application packages are electronically distributed from a resource of the software application to the destinations. The destinations include, but are not limited to desktop and laptop personal computers, personal digital assistants (PDAs), cellular telephones, etc. The destinations are generically referred to herein as workstations or clients. The software application packages are reassembled at the destinations prior to the execution of the software application.

Many client-server systems for electronically distributing a software application divided into one or more software application packages to a plurality of clients are hierarchical systems with several tiers. An exemplary client-server hierarchical system comprises, for example, a Central System Management Server site server (Central SMS site server), a plurality of child SMS site servers, a plurality of Distribution servers, and a plurality of clients. At the apex of the hierarchical system is the Central SMS site server that stores the one or more software application packages that make up the software application. The Central SMS site server is usually located at the resource, i.e., the location where the software application is divided into a plurality of software application packages for distribution to the clients. The plurality of child SMS site servers and a plurality of Distribution servers each located at different geographical locations that are different from the location of the Central SMS site server form a tier (first tier) located below the apex of the hierarchical system. A child SMS site server and a Distribution server are machines that have a server class operating system. A difference between a child SMS site server and a Distribution server is that the child SMS site server usually has a greater number of processors with higher processing speeds than the Distribution server. As a result, a child SMS site server is usually capable of servicing more clients than a Distribution server. Each first tier server, i.e., child SMS site server and Distribution server is connected via a first network to the Central SMS site server and via a second network to the other first tier servers. The first and second networks may be a Wide Area Network (WAN), a Local Area Network (LAN), or a combination thereof. Further, the second network may be part of the first network, or an entirely separate network. Each first tier server is connected via a third network to a plurality of clients with a same network address or similar common identifier that form the lowest tier (second tier) of the hierarchical system. The network connecting each first tier server to the plurality of clients with the same network address may also be a WAN, LAN, or combination thereof. Further, the third network may be part of the first network, second network, or an entirely separate network.

FIG. 1A is a pictorial diagram illustrating an exemplary prior art client-server hierarchical system 100 of the type described above. In this example, Central SMS site server (SMS1) 101 is physically closer to first child SMS site server (SMS2) 102 than to a second child SMS site server (SMS3) 103. Similarly, SMS2 is physically closer to a first Distribution server (DP1) 104 than to second or third Distribution servers (DP2 or DP3) 105 and 106, which are closer to SMS3. Similarly, a plurality of clients 107 with the same network address are physically closer to DP1 than to SMS2, SMS3, DP2, or DP3. For the sake of simplicity, FIG. 1A only shows the shortest paths taken by a software application package (shown by solid arrow lines) and by an associated plurality of software application package policies (shown by dashed arrow lines) to and from SMS1 and 107. The paths of the solid and dashed arrows are marked 1-5 and are described below. It is to be understood that the software application package and the plurality of software application package policies may take paths (not shown) to and from, for example SMS1, SMS3, DP3, and the plurality of clients 107, or SMS1, SMS3, DP1, and the plurality of clients 107, or any other suitable combination thereof. Further, for the sake of simplicity, the first, second, and third networks are not physically shown in FIG. 1A, but it is to be understood that the arrows indicating the paths taken by the software application package (arrows marked 1, 2, and 5), and the paths taken by the plurality of software application package policies (arrows marked 3 and 4) to and from, for example, SMS1, SMS2, DP1, and the plurality of clients 107 are paths taken via suitable networks, e.g., the first, second, or third networks described above. Furthermore, for the sake of simplicity, only one path (arrow marked 5) is shown to collectively indicate the plurality of paths from each of the plurality of clients 107 that pull a software application package from DP1. It is also to be understood that the second network connecting the plurality of clients 107 to DP1 is part of the network connecting DP1 to SMS2, and the network connecting SMS2 to SMS1.

Returning to FIG. 1A, the Central SMS site server (SMS1) 101 is at the apex of the hierarchical system. As discussed above, SMS1 is the resource from where a software application, divided into a plurality of software application packages, is electronically distributed to a plurality clients with the same network address or similar common identifier. SMS1 is connected via a WAN, LAN, or combination thereof network (not physically shown) to the first tier child SMS site server (SMS2) 102 located at a second geographical location, and the second first tier child SMS site server (SMS3) 103 located at a third geographical location. SMS2 and SMS3 are each connected via a WAN, LAN, or combination thereof network (not physically shown) to each other and to the first tier Distribution server (DP1) 104 located at a fourth geographical location, the second first tier Distribution server (DP2) 105 located at a fifth geographical location, and the third first tier Distribution server (DP3) 106 located at a sixth geographical location. It should be noted that there can be more than one first tier Distribution server per geographical location, if necessary. DP1, DP2, and DP3 are each connected via a WAN, LAN, or combination thereof network (not shown) to the plurality of clients (C1, C2, . . . , CN) 107 located at a seventh geographical location. The plurality of clients 107 have the same network address or similar common identifier and form the second tier of the hierarchical system 100.

In an exemplary hierarchical client-server system 100 of the type illustrated in FIG. 1A, a software application running on the Central SMS site server, i.e., SMS1 "pushes" a software application package (marked by arrow "1") to the first tier child SMS site server, i.e., SMS2. As mentioned above, the software application package is also "pushed" by SMS1 to the second first tier child SMS site server, i.e., SMS3, but, as noted above, the path taken by the software application package from SMS1 to SMS3 is not shown for the sake of simplicity. A software application running on SMS2 "pushes" a copy of the software application package received from SMS1 (marked by arrow "2") to the first tier Distribution server, i.e., DP1. The copy of the software application package also may be "pushed" by SMS2 to other first tier Distribution servers, i.e., DP2 and DP3, or "pushed" by SMS3 to each of first tier Distribution servers, i.e., DP1, DP2, and DP3, but, as noted above, these paths are not shown for the sake of simplicity. A software application running on SMS1 "pushes" a plurality of policies associated with the software application package (marked by arrow "3") to the first tier child SMS site server, i.e., SMS2. As mentioned above, the plurality of software application package policies are also "pushed" by the software application running on SMS1 to the second first tier child SMS site server, i.e., SMS3, but the path is not shown for the sake of simplicity. A software application running on each of the plurality of clients 107, i.e., on C1, C2, ..., CN sends a signal at predetermined intervals (not shown) to query SMS2. The signal is sent to query whether SMS2 has one or more software application packages that the clients need. It should be noted, that the signal is also sent at the predetermined intervals (not shown) by the software application running on each of C1, C2, ..., CN to the other child SMS site server in the hierarchical system, i.e., SMS3. Once the plurality of software application package policies are received by SMS2 (when the arrow marked "3" is completed), the software application on each of C1, C2, ..., CN "pulls" the plurality of the software application package policies (marked by arrow "4") from SMS2. It should be noted that since the signal is also sent by the software application running on each of C1, C2, ..., CN to SMS3, the software application running on each of C1, C2, ..., CN could also "pull" the plurality of software application policies from SMS3. But as mentioned above, for the sake of simplicity, only the shortest path taken by the plurality of policies of the software application package is shown in FIG. 1A. Next, the software application running on each of C1, C2, ..., CN determines if the plurality of software application package policies pulled from SMS2 is for a software application package needed by these clients. If the plurality of software application package policies pulled from SMS2 is for a software application package that the clients need, a software application running on the clients "pulls" the software application package from DP1 (marked by arrow "5"). It should be noted again, that the software application package could be "pulled" from the other Distribution servers in the client-server hierarchical system 100, i.e., DP2 or DP3. But as mentioned above, for the sake of simplicity, only the shortest path taken by the software application package is shown in FIG. 1A.

FIG. 1B is a timeline diagram of the exemplary paths taken by the software application package and the plurality of software application package policies, as shown in FIG. 1A and described above. For the sake of simplicity, FIG. 1B illustrates the timeline of the paths for one software application package and the policy associated with the software application package for a single client. Further, the exemplary timeline diagram illustrated in FIG. 1B comprises a Central SMS site server, a single child SMS site server, and a single Distribution server. It should be noted, however, that the paths taken by the software application and the plurality of associated software application policies and the timing sequence for these paths will be similar if more than one software application package (and hence more than one plurality of associated software application package policies) exists, or if there is more than one child SMS site server, Distribution server, or client.

Returning to FIG. 1B, the Central SMS site server "pushes" the software application package to the child SMS site server when the software application package is ready to be electronically distributed to the plurality of clients. The "push" of the software application package by the Central SMS site server is shown by the arrow marked "1." Next, a copy of the software application package is "pushed" by the child SMS server to the Distribution server. The "push" of the software application package by the child SMS server to the Distribution server is shown by the arrow marked "2." Next, the plurality of associated software application package policies are "pushed" by the Central SMS site server to the child SMS site server. The "push" of the plurality of software application package policies by the Central SMS site server to the child SMS site server is shown by the arrow marked "3." Before the "push" of the plurality of software application package policies by the Central SMS site server to the child SMS site server is completed, the client may send a query at a predetermined time interval to the child SMS site server to query if the child SMS site server has the software application package. Even though the Distribution server has the software application package (on the completion of the arrow marked "2"), the software application package cannot be distributed to the client prior to the child SMS site server receiving the associated software application package policies. Once the arrow marked "3" is completed, the plurality of software application package policies is "pulled" by the client from the child SMS site server. The "pull" of the plurality of software application package policies is shown by the arrow marked "4." Upon completion of the policy pulling, since the software application is already "hosted" on the Distribution server (on the completion of the arrow marked "2"), a querying client can "pull" the software application package from the Distribution server. The "pull" of the software application package from the Distribution server by the client is shown by the arrow marked "5."

There are several drawbacks with the exemplary prior art method described above and illustrated in FIGS. 1A and 1B. First, the software application packages are distributed from the Central SMS site server to the plurality of Distribution servers via one of a plurality of child SMS site servers when the software application packages are ready to be electronically distributed. This means that there may be an unnecessary usage of disk space on the Distribution servers and the child SMS site servers before clients decide they need to pull the software application packages. If clients do not need the software application packages, there may be no need to store them on the child SMS site servers and/or Distribution servers. For example, since clients pull the software application packages from a Distribution server, there may be situations where none of the clients serviced by a Distribution server need to pull the software application packages. This means that the software application packages occupy disk space on the Distribution server that could be used for other purposes. Second, since each client pulls the software application packages, there could be a situation when a plurality of clients with the same network address or similar common identifier decide to pull the software application packages at the same time. Since the plurality of clients have the same network address or similar common identifier, the plurality of clients each pull the software application packages from the same Distribution server using the same network. Since the plurality of clients are pulling from the same Distribution server at the same time and over the same network, the time to download the packages is increased.

SUMMARY

This summary is provided to introduce a selection of concepts in a simplified form that are further described below. This summary is not intended to identify key features of the claimed subject matter, nor is it intended to be used as an aid in determining the scope of the claimed subject matter.

Rather than employing a server to function as a Distribution Point (DP), a client included in a plurality of clients with a same network address or similar common identifier serves as a Distribution Point (client DP) for distributing a software application divided into a plurality of software application packages. More specifically, the client DP, hereinafter called the PDP agent, is part of a client-server hierarchical system that also includes a Central SMS site server and a plurality of Distributing servers. A Distributing server in the plurality of Distributing servers is assigned to the plurality of clients based on their network address. The PDP agent is connected to other clients with the same network address or similar common identifier. The Distributing servers are each connected to the Central SMS site server. The PDP agent forms a Central SMS site server advance client in the hierarchical system. A software application running on the Central SMS site server "pushes" a plurality of software application package policies to a software application suite running on the Distributing servers. A software application suite on the PDP agent and a software application on each client in the plurality of clients "pull" the plurality of software application package policies from the software application suite running on a Distributing server assigned to the plurality of clients when the plurality of software application package policies are ready for distribution. Pulling the plurality of software application package policies triggers the software application running on the Central SMS site server to "push" the software application package associated with the policies to the software application suite on the Distributing server. If the PDP agent needs the software application package associated with the policy pulled from the software application suite running on the Distributing server assigned to the plurality of clients, and the software application package has been successfully pushed by the software application on the Central SMS site server to the software application suite running on the Distributing server, the software application suite running on the PDP agent pulls the software application package. A software application running on each client in the plurality of clients "pulls" the software application package from the PDP agent, as and when needed.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a state diagram illustrating exemplary states (stages) that a PDP job goes through.

DETAILED DESCRIPTION

A hierarchical client-server system for electronically distributing a software application divided into one or more software application packages to a plurality of clients is described. More specifically, an exemplary client-server hierarchical system that comprises a Central SMS site server, a plurality of Distributing servers, and a plurality of clients is described. At the apex of the hierarchical system is the Central SMS site server, which stores the one or more software application packages that make up the software application. The Central SMS site server is usually the resource, i.e., the location where a software application is divided into a plurality of software application packages for distribution to clients. An administrator at the resource assigns a Distributing server in the plurality of Distributing servers to the plurality of clients. The selection of the Distributing server assigned to the plurality of clients is based on the network address of the clients, proximity of the clients to the Distributing server, etc. Each of the plurality of Distributing servers are preferably located at different geographical locations that, in turn, are preferably different from the Central SMS site server location. The plurality of Distributing servers form a tier (first tier) located below the apex of the hierarchical system. Each first tier server is connected, preferably via a first network, to the Central SMS site server and, preferably, via a second network to the other first tier servers. The first and second networks may be a Wide Area Network (WAN), a Local Area Network (LAN), or a combination thereof. Further, the second network may be part of the first network, or an entirely separate network. Each first tier server is connected, preferably via a third network, to a plurality of clients with the same network address or similar common identifier. The plurality of clients form a lowest tier (second tier) of the hierarchical system. The networks connecting each first tier server to the plurality of clients may also be a WAN, LAN, or combination thereof. Further, the third network may be part of the first network, second network, or an entirely separate network. Each client in the plurality of clients with the same network address or similar common identifier is connected to each other, preferably via a fourth network. The fourth network may also be a WAN, LAN, or a combination thereof. Further, the fourth network may be a part of the first, second, or third networks, or an entirely separate network. One of the clients in the plurality of clients functions as a Distribution Point (client DP) in the exemplary client-server hierarchical system discussed above. As mentioned above, the client DP is also called a PDP agent.

Figure 1A:
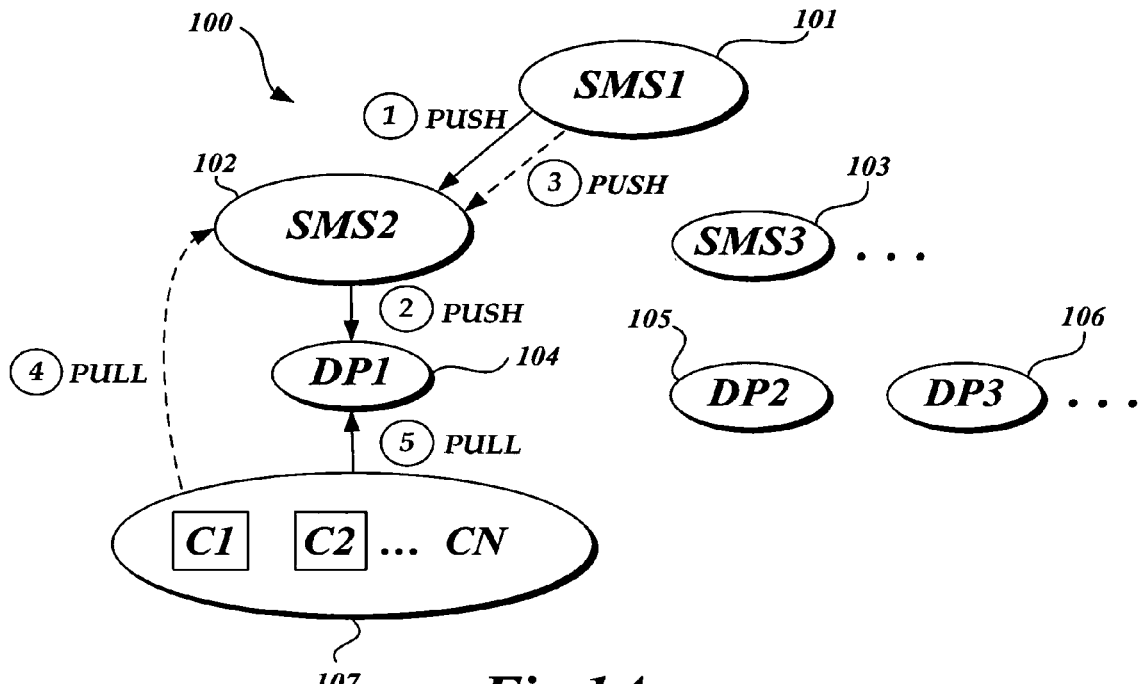
FIG. 1A is a pictorial diagram illustrating an exemplary prior art client-server hierarchical system.
Figure 1B:
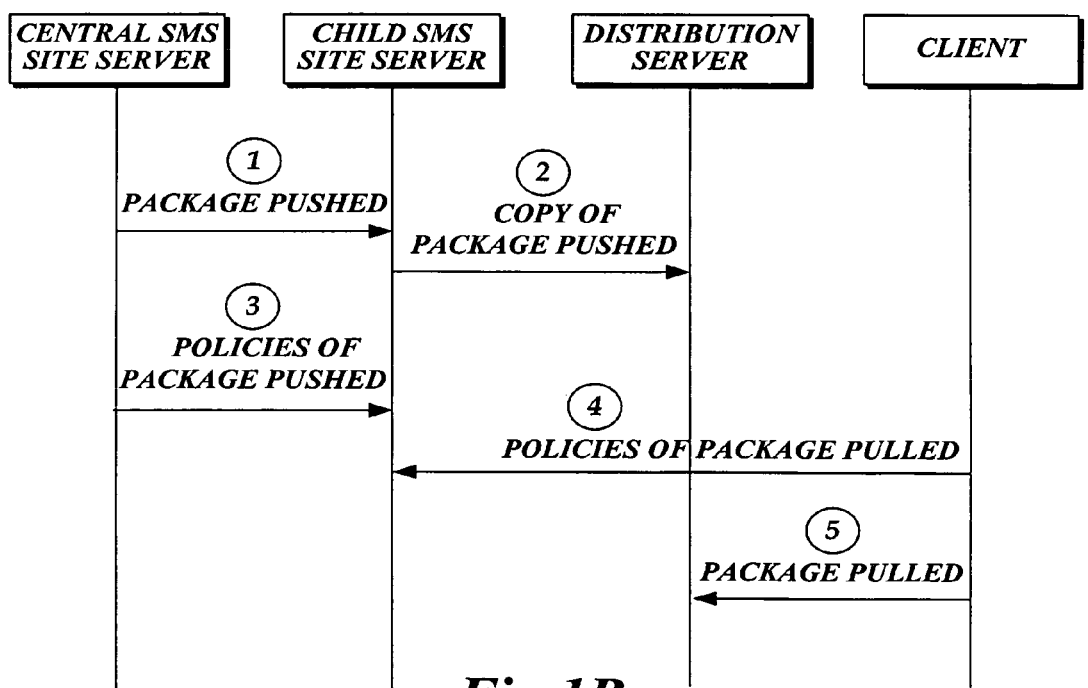
FIG. 1B is a timeline diagram of exemplary paths taken by a software application package and the plurality of associated software application package policies of a portion of the exemplary prior art client-server hierarchical system illustrated in FIG. 1A.
Figure 1C:
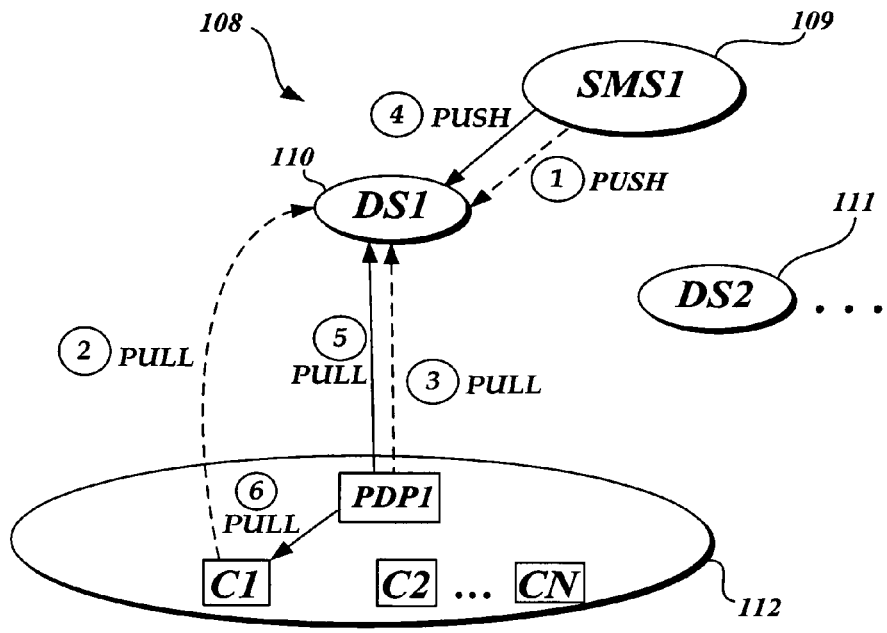
FIG. 1C is a pictorial diagram illustrating an exemplary client-server system.

FIG. 1C is a pictorial diagram illustrating an exemplary client-server hierarchical system 108 of the type described above with a client designated as a PDP agent (PDP1). More specifically, FIG. 1C includes a central SMS site server (SMS1) 109, two Distributing servers (DS1 and DS2) 110 and 111, and a plurality of clients (C1, C2 . . . CN) 112 with the same network address or similar common identifier. Preferably, SMS1 is physically closer to DS1 than to DS2. Similarly, preferably the plurality of clients 112 are physical closer to DS1 than to SMS1, or DS2. Hence, for the sake of simplicity, FIG. 1C only shows the paths taken by the software application package and by the plurality of associated software application package policies to and from SMS1 and the plurality of clients 112 via assigned Distributing server DS1. The paths taken by the software application package and the plurality of software application package policies are hereinafter arrows marked 1-6. It is to be understood that the software application package and the plurality of associated software application package policies may take paths (not shown) to and from the plurality of clients, for example from SMS1 via DS2. Further, for the sake of simplicity, the first, second, third, and fourth networks are not physically shown in FIG. 1C. However, it is to be understood that the arrows indicating the paths taken by the software application package (arrows marked 4, 5, and 6), and the paths taken by the plurality of software application package policies (arrows marked 1, 2, and 3) are network paths. Furthermore, for the sake of simplicity, only one path (arrow marked 6) collectively indicates the plurality of paths employed by the clients (C1, C2, . . . , CN) 112 when pulling the software application package from PDP1. It is also to be understood that the network connecting the plurality of clients 112 to DS1 is part of the network connecting DS1 to SMS1.

Returning to FIG. 1C, the Central SMS site server (SMS1) 109 is at the apex of the hierarchical system. As discussed above, SMS1 is the resource from where the software application, divided into a plurality of software application packages, is electronically distributed to individual clients. SMS1 is connected via a WAN, LAN, or combination thereof network (not physically shown) to the first tier Distributing server (DS1) 110 located at a second geographical location, and to the second first tier Distributing server (DS2) 111 located at a third geographical location. DS1 and DS2 are each connected via a WAN, LAN, or combination thereof network (not physically shown) to each other. It should be noted that there can be more than one first tier Distributing server located per geographical location, if desired, rather than one Distributing server per geographical location as illustrated in FIG. 1C. DS1 and DS2 are each connected via a WAN, LAN, or combination thereof network (not shown) to the PDP agent (PDP1) included in the plurality of clients 112 located at a fourth geographical location. As noted above, the other clients of the plurality of clients 112 have the same network address or similar common identifier as PDP1 and together with PDP1 form the second tier of the hierarchical system 108.

In an exemplary hierarchical client-server system 108 of the type illustrated in FIG. 1C, a software application running on the Central SMS site server, i.e., SMS1 "pushes" a plurality of software application package policies (marked by arrow 1) to the first tier Distributing server, i.e., DS1. As mentioned above, the plurality of software application package policies are also "pushed" by SMS1 to the second (and other) first tier Distributing servers, i.e., DS2, but the path taken by the plurality of software application package policies from SMS1 to DS2 is not shown for the sake of simplicity. As mentioned above, since DS1 is assigned to the plurality of clients, a software application running on each of the plurality of clients (C1, C2, . . . , CN) 112, and a software application suite running on PDP1 sends a query at predetermined intervals (not shown) to DS1. The query asks whether DS1 has one or more software application package policies that the clients need. After the plurality of software application package policies are received by DS1 (when the arrow marked 1 is completed), the software application running on each of C1, C2, . . . , CN "pulls" the plurality of software application package policies (marked by arrow 2) from DS1. Similarly, the software application suite running on PDP1 "pulls" the plurality of software application package policies (marked by arrow 3) from DS1. Since clients C1, C2, . . . , CN, and PDP1 query DS1 at predetermined time intervals, the arrows marked 2 and 3 could be interchanged.

Once the plurality of software application package policies is pulled by the clients (including the PDP agent), the software application running on SMS1 is triggered to "push" (arrow marked 4) the software application package associated with the policy to the Distributing server from which the plurality of software application package policies were pulled, i.e., DS1. As mentioned above, since the clients (including the PDP agent) query DS1 at predetermined time intervals, there may be a situation when a client, for example, C1 may "pull" the plurality of software application package policies that it needs before PDP1 has pulled the software application package. In this situation, C1 waits until PDP1 has "pulled" the software application package (arrow marked 5) before C1 "pulls" the software application package from PDP1 (arrow marked 6). Similarly, the other clients (C2, . . . , CN) can only pull the software application package from PDP1 after PDP1 has pulled the software application package from DS1. Since the network connecting DS1 to the plurality of clients 112 is usually used by other PDP agents to "pull" software application packages, the network connecting DS1 to the plurality of clients 112 may be slow. Unlike the prior art method mentioned above where each client pulls the software application package from a distribution server, the speed of this network is not as significant since only one client (PDP1) pulls the software application package. Further, since the plurality of clients 112 are connected by a common network, the clients can be scheduled efficiently to "pull" the software application package from PDP1.

Figure 1D:
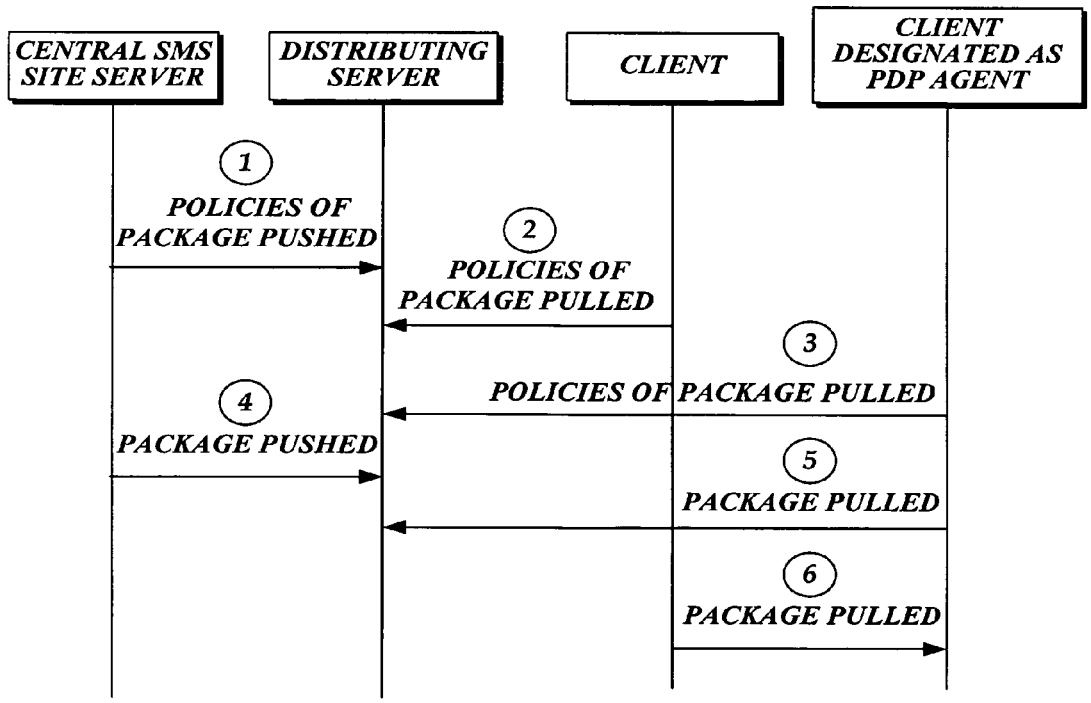
FIG. 1D is a timeline diagram of exemplary paths taken by a software application package and the plurality of associated software application package policies of a portion of the exemplary client-server system illustrated in FIG. 1C.

FIG. 1D is a timeline diagram of the exemplary paths taken by the software application package and the plurality of associated software application package policies for elements of the client-server system as shown and described in FIG. 1C above. More specifically, for the sake of simplicity, FIG. 1D illustrates the paths and the timing sequence for one software application package and the policies associated with the software application package for a group of clients with a same network address or similar common identifier. Further, the exemplary hierarchical client-server system illustrated in FIG. 1D comprises a Central SMS site server and a single Distributing server. It should be noted, however, that the paths taken by the software application and the plurality of associated software application policies and the timing sequence for these paths will be similar if more than one software application package (and hence more than one plurality of associated software application package policies) is to be distributed, or if the client-server system includes more than one Distributing server, or group of clients with the same network address or similar common identifier.

Returning to FIG. 1D, the Central SMS site server "pushes" the plurality of software application package policies to the Distributing server when the software application package is ready to be electronically distributed to the plurality of clients. The "push" of the plurality of software application package policies is shown by the arrow marked 1. Next, a client (other than the PDP agent) "pulls" the plurality of software application package policies from the Distributing server. The "pull" of the plurality of software application package policies by the client is shown by the arrow marked 2. Next (or possibly prior), the PDP agent "pulls" the plurality of software application package policies from the Distributing server. The "pull" of the plurality of software application package policies by the PDP agent is shown by the arrow marked 3. As mentioned above, arrows marked 2 and 3 can be interchanged. Also, as mentioned above, the "pull" of the plurality of software application package policies triggers the software application running on the Central SMS site server to "push" the software application package to the Distributing server from where the plurality of software application package policies were pulled. Hence, next, the Central SMS site server "pushes" the software application package to the Distributing server. The "push" of the software application package from the Central SMS site server is shown by the arrow marked 4. Next, the PDP agent "pulls" the software application package from the Distributing server. The "pull" of the software application package from the Distributing server is shown by the arrow marked 5. Finally, the client "pulls" the software application package from the PDP agent. The "pull" of the software application package from the PDP agent is shown by the arrow marked 6.

As mentioned above, the PDP agent "pulls" the plurality of software application package policies before the PDP agent "pulls" the software application package from a software application suite running on the Distributing server managing the software application package. A software application running on the individual clients "pulls" the software application package from the PDP agent, as and when needed.

The software application suite running on the PDP agent comprises several software components, for example, a File Transfer Configuration Manager (such as BITS 2.0), a PDP Manager, and a PDP Job Manager. These components allow the PDP agent to pull software application packages from the software application suite on the Distributing server. An SMS administrator at the Central SMS site server generates a plurality of software policies (or rules) for the Distributing server to create, control, and maintain the software components of the PDP agent. These policies also allow the SMS administrator to efficiently manage the distribution of software application packages within a network of branch locations containing a plurality of clients by affecting the manner in which the software components of the software application suite running on the Distributing server interact with each other and with the software components of the PDP agent. The policies include a file transfer (such as BITS 2.0) configuration policy managed by the File Transfer Configuration Manager software component of the PDP agent, a PDP configuration policy managed by the PDP Manger software component of the PDP agent, and a PDP package download policy managed by the PDP Job Manager software component of the PDP agent.

The software application suite running on the Distributing server comprises several software components, for example, a Hierarchy Manager (HM), a Distribution Manager (DM), a Policy Provider (PP), and a Management Point (MP) containing a Location Manager (LM) and a Relay Manager (RM). The HM is responsible, amongst other tasks, for storing information about a plurality of PDP agents. The DM is responsible, amongst other tasks, for maintaining a plurality of mapping tables on the Distributing server. The PP is responsible, amongst other tasks, for creating and maintaining the PDP package download policy and the PDP configuration policy. The LM on the MP is responsible, amongst other tasks, for creating a PDP agent provisioning request. The RM on the MP is responsible, amongst other tasks, for relaying the PDP agent provisioning request to the DM.

Figure 2:
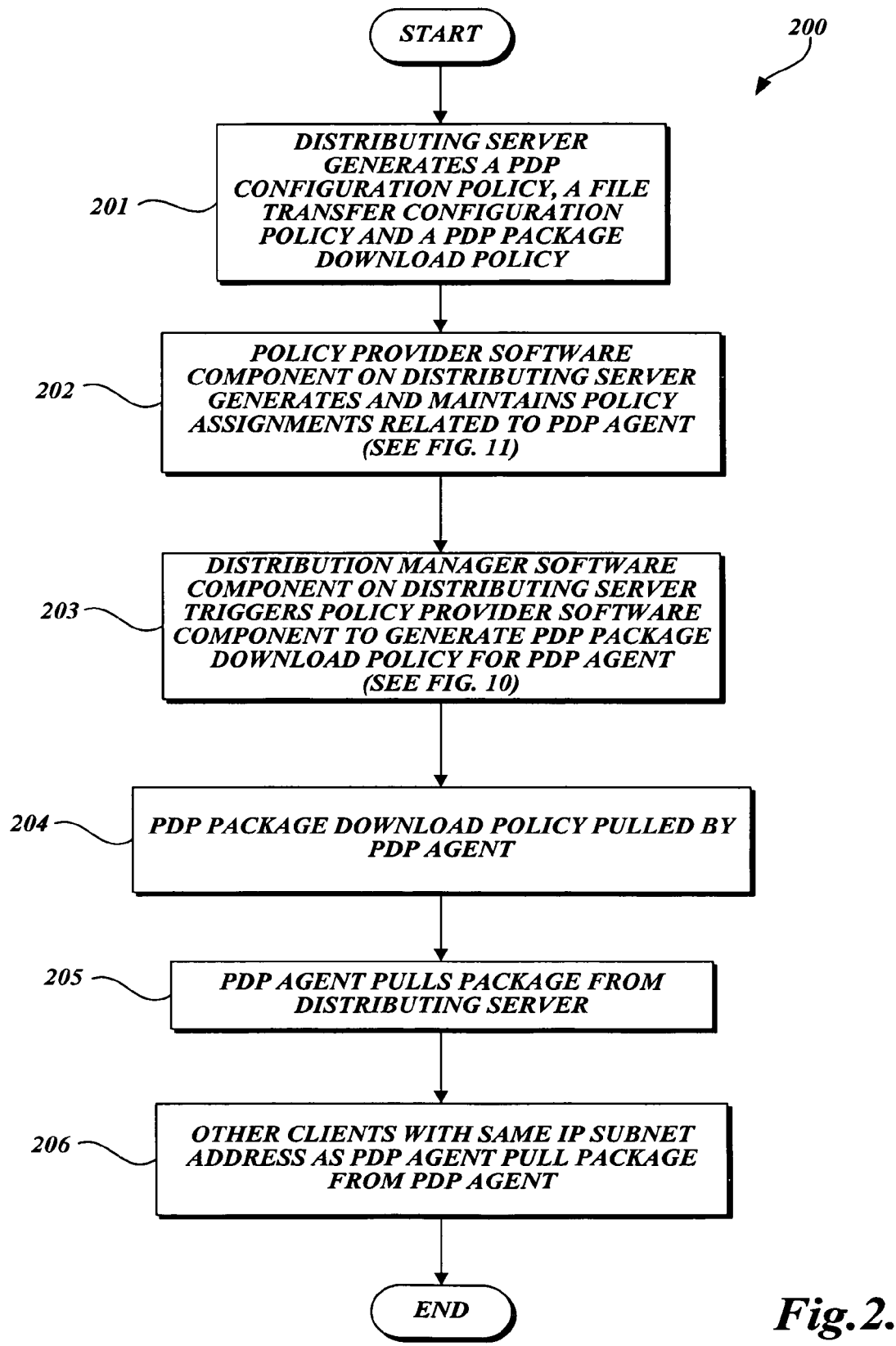
FIG. 2 is a functional flowchart illustrating exemplary actions taken by an SMS when a client is designated a PDP agent.

FIG. 2 is a functional flowchart 200 illustrating exemplary actions taken by a Distributing server when a client included in a plurality of clients, for example, a client included in a plurality of clients located in a branch office, is designated a PDP agent (for example, PDP1 in FIG. 1C). At block 201, the software application suite on the Distributing server (for example, DS1 in FIG. 1C) generates software policies, for example, a PDP configuration policy, a file transfer (such as BITS 2.0) configuration policy, and a PDP package download policy. The PDP configuration policy enables or disables the PDP agent running on a client. When enabled, the PDP agent can process requests for software application package download and provisioning from the file transfer configuration policy and the PDP package download policy. When disabled, the PDP agent does not respond to the file transfer configuration policy and the PDP package download policy requests. The file transfer configuration policy configures the various file transfer properties of the client. The PDP agent upon receiving the file transfer configuration policy proceeds to add/modify the file transfer settings via the Group Policy Objects (GPO)/registry of the client. It should be noted that the file transfer configuration policy is only applied to the client if the client is configured and enabled to be a PDP agent by the PDP configuration policy mentioned above. The PDP package download policy configures a software application package on the PDP agent. The PDP agent will download, update, maintain, and delete a software application package and its content based on the PDP configuration policy described above. If the client is not enabled as a PDP agent, it will not perform the download, update, maintenance, or deletion of a software application package. It should be noted that once a client is disabled as a PDP agent, the one or more software application packages that were pulled to the PDP agent before the client was disabled as a PDP agent are not revoked. In other words, the software application packages existing on the PDP agent before the PDP agent is disabled can be "pulled" by the other clients, but the software application packages cannot be modified or updated before the other clients "pull" the packages. It also means that the software application packages existing on the PDP agent before the PDP agent is disabled can be deleted, but no new software application packages can be downloaded to the PDP agent for distribution.

Returning to FIG. 2, at block 202, the PP software component (see FIG. 11 and the following description thereof) of the software application suite on the Distributing server generates and maintains policy assignments related to the PDP agent. More specifically, the PP software component creates and maintains the PDP package download policy and the PDP configuration policy, and the assignments for both policies. The PDP package download policy is derived from the software application package, and is populated by the PP software component with software application package properties such as a software application package ID, a source version, hash, etc. Simultaneously, the PDP configuration policy is targeted to each PDP agent in a pool of PDP agents, while the PDP package download policy is targeted to the pool of PDP agents that the software application package is assigned to.

Figure 11:
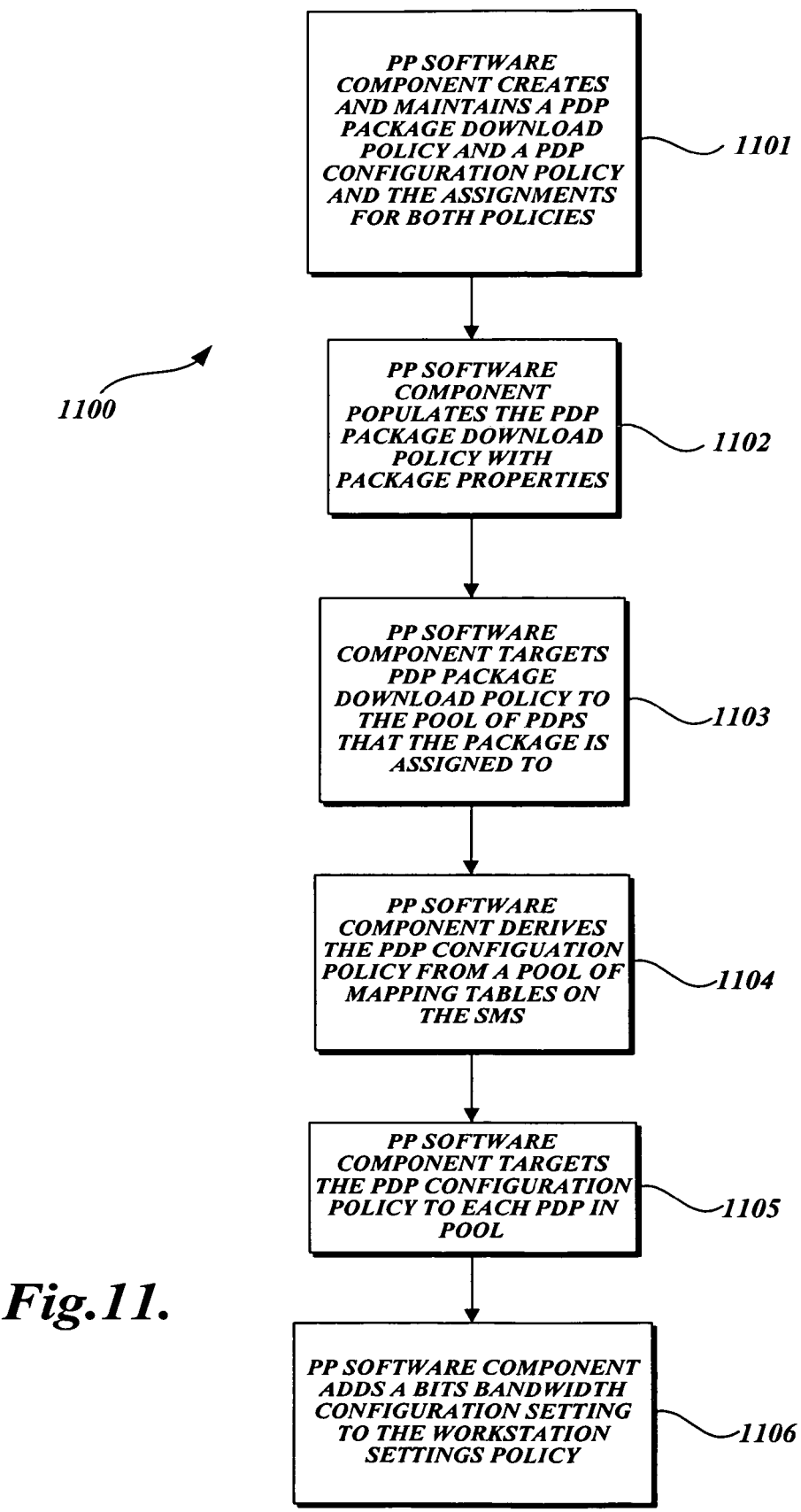
FIG. 11 is a functional flowchart illustrating exemplary actions taken by the Policy Provider software component of the SMS.

FIG. 11 is a functional flowchart 1100 illustrating exemplary actions taken by the PP software component of the software application suite running on the Distributing server that generates and maintains the policy assignments related to the PDP agent. At block 1101, the PP software component creates and maintains a PDP package download policy and a PDP configuration policy, and the assignments for both policies. At block 1102, the PP software component populates the PDP package download policy with software application package properties. At block 1103, the PP software component targets the PDP package download policy to a pool of PDP agents that the software application package is assigned to. At block 1104, the PP software component derives the PDP configuration policy from a pool of mapping tables on the Distributing server managed by the DM software component of the Distributing server. Finally, at block 1105, the PP software component targets the PDP configuration policy to each PDP agent in the pool of PDP agents. It should be noted that the actions in block 1103 always occur after the actions in block 1102, and the actions in block 1105 always occur after the actions in block 1104. The actions in blocks 1102 and 1104 may occur simultaneously, or sequentially as depicted.

Returning to FIG. 2, at block 203, the DM software component of the software application suite on the Distributing server triggers the PP software component to generate a PDP package download policy for the PDP agent. As mentioned above, the PDP configuration policy and the PDP package download policy, and their assignments are generated by the PP software component. The PP software component accesses different mapping tables on the Distributing server that map the software application packages to the PDP agent and the PDP agent to the resource of the software application package. These mapping tables are updated and maintained by the DM. DM is also responsible for copying contents of the software application package on the PDP agent, as well as performing delta updates (see FIG. 10 and the following description thereof) on the PDP agent. The DM uses a thread, for example DP Manager thread, for updating and maintaining mapping tables, for example a DistributionPoints table that reflects that the software application package will not be "pushed" onto the PDP agent from the Distributing server, but cached by the PDP agent. Preferably, the PDP agent pulls the software application package from the Distributing server when needed. The DP Manager thread waits on notification from the HM software component of the software application suite on the Distributing server after changes are made to the list of PDP agents in the DistributionPoints table. Once the mapping tables are updated, the DM notifies the PP software component to create policies for the PDP agent. When a PDP agent is marked for deletion, the DP Manager thread on the Distributing server is triggered to check if the PDP agent belongs to the client-server hierarchical system of the Distributing server. If the PDP agent belongs to the client-server hierarchical system of the Distributing server, the entry for the PDP agent is removed from mapping tables. The deletion of the PDP agent entry from the mapping tables triggers the revocation of the policies generated by the PP software component.

Figure 10:
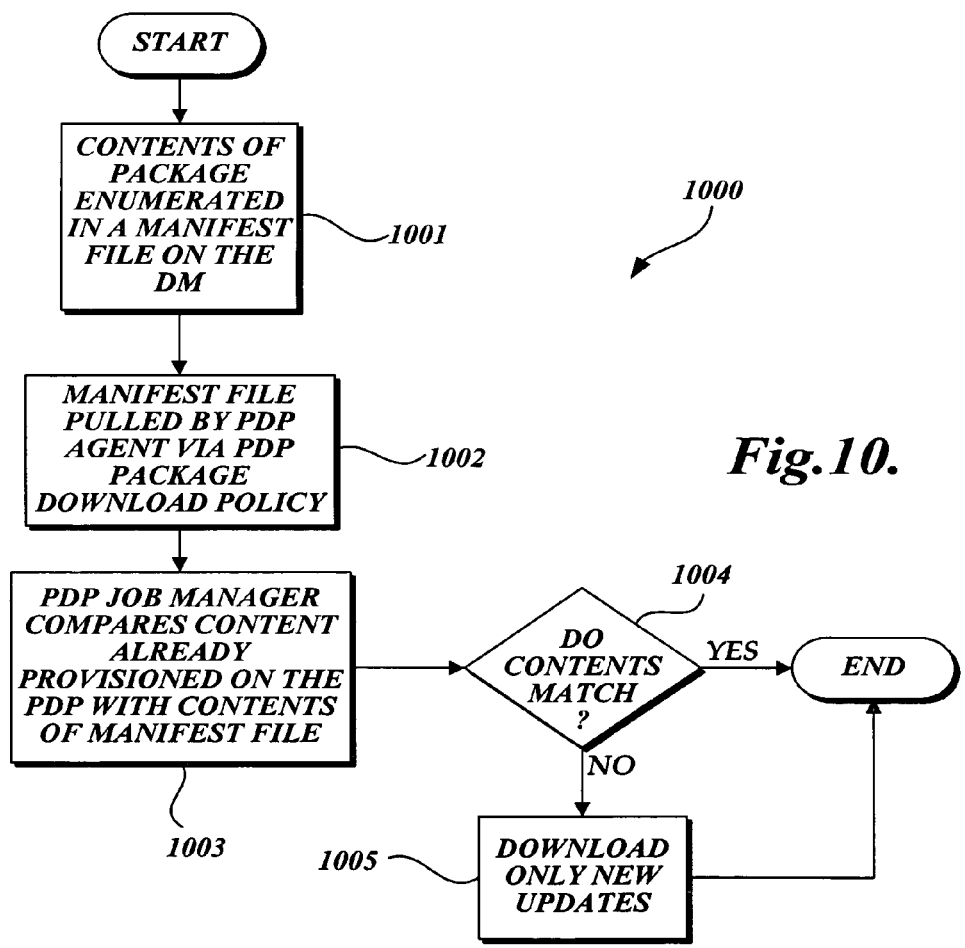
FIG. 10 is a functional flowchart illustrating an exemplary delta update task performed by the Distribution Manager software component of the SMS.

FIG. 10 is a functional flowchart 1000 illustrating an exemplary delta update task performed by the DM on a PDP agent. A delta update task is an update task that updates only the portion (delta) of a software application package that is new or different from the software application package already pulled by a PDP agent. At block 1001, the contents of the software application package are enumerated in a manifest file on the DM. At block 1002, the manifest file is pulled by the PDP agent via the PDP package download policy. At block 1003, the PDP Job Manager software component on the PDP agent compares the contents of the software application package already provisioned on the PDP agent with the contents of the manifest file. At block 1004, a check is made by the PDP Job Manager to determine if the contents of the software application package already provisioned on the PDP agent and the contents of the manifest file match. If the contents match (the "YES" branch from 1004), there is no change to the contents of the software application package already provisioned on the PDP agent and the flow ends. If, the contents do not match (the "NO" branch from 1004), at block 1005, the PDP Job Manager coordinates the download of only the portion (delta) of the manifest file contents that are different from the contents of the software application package provisioned on the PDP agent.

Returning to FIG. 2, at block 204, the PDP package download policy is "pulled" by the PDP agent. Once the PDP agent has the PDP package download policy, which contains amongst other items the properties of the software application package to be downloaded, the PDP agent is ready to download the software application package. At block 205, the PDP agent "pulls" the software application package from the Distributing server. After the software application package is completely downloaded to the client designated as the PDP agent, the PDP agent moves the software application package from a temporary location to a location on the hard-drive of the PDP agent that is accessible to other clients in the plurality of clients. At block 206, the plurality of clients with the same network address or similar common identifier as the PDP agent "pull" the software application package from the PDP agent when needed. Software on the other clients, like the software on the PDP agent, store the software application package on their hard-drive as the package is downloaded. It should be noted that blocks 201, 202, and 203 may occur simultaneously, or sequentially as illustrated in FIG. 2.

Figure 3:
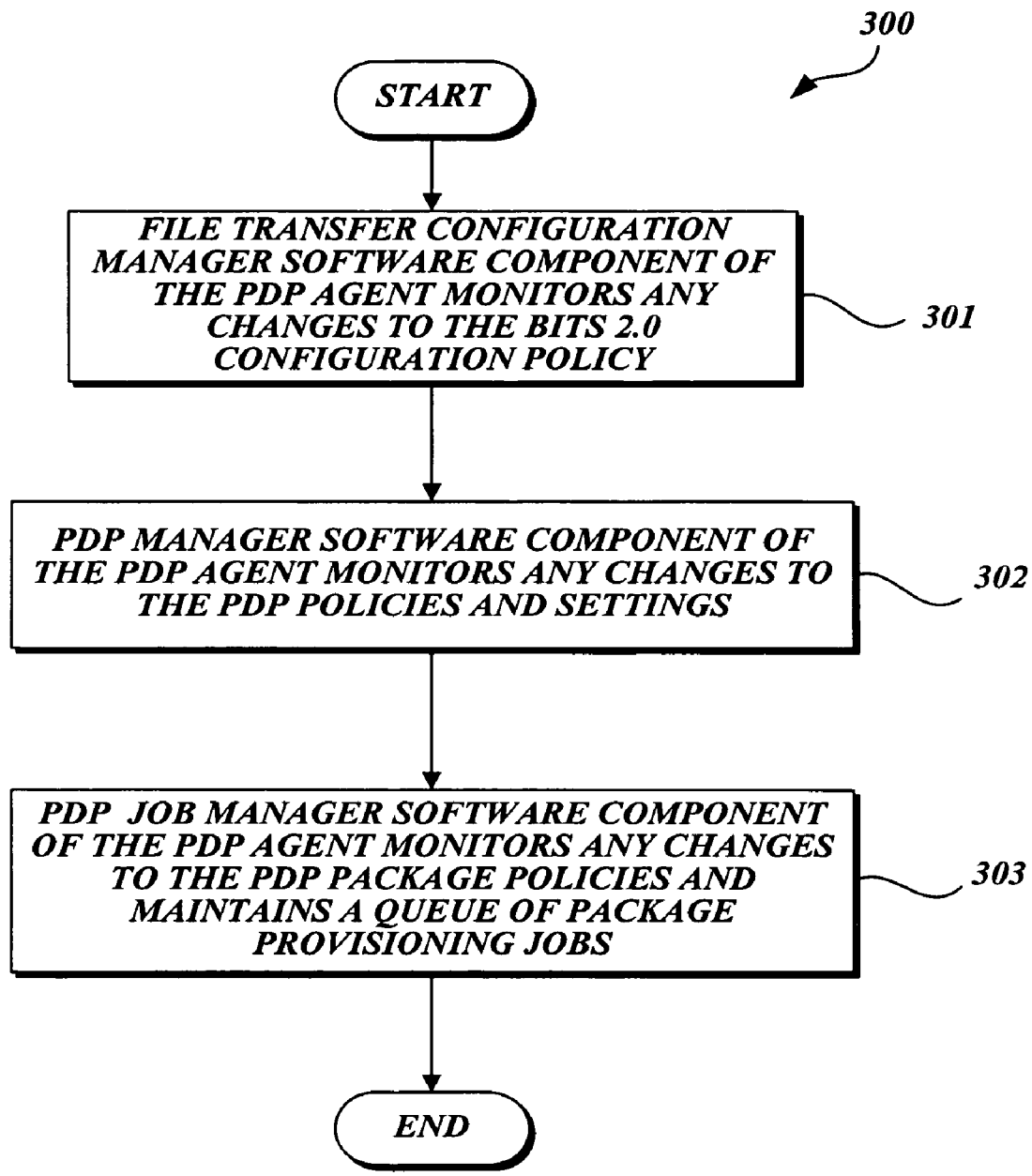
FIG. 3 is a functional flowchart illustrating exemplary actions taken by a PDP agent.

FIG. 3 is a functional flowchart 300 illustrating exemplary actions taken by a PDP agent. At block 301, the File Transfer Configuration Manager software component of the software application suite on the PDP agent monitors for changes to the file transfer configuration policy. At block 302, the PDP Manager software component of the software application suite on the PDP agent monitors for changes to the PDP policies and settings. At block 303, the PDP Job Manager software component of the software application suite on the PDP agent monitors for changes to the PDP software application package policies and maintains a queue of software application package provisioning jobs. It should be noted that blocks 301, 302, and 303 may occur simultaneously, or sequentially as illustrated in FIG. 3.

Figure 4:
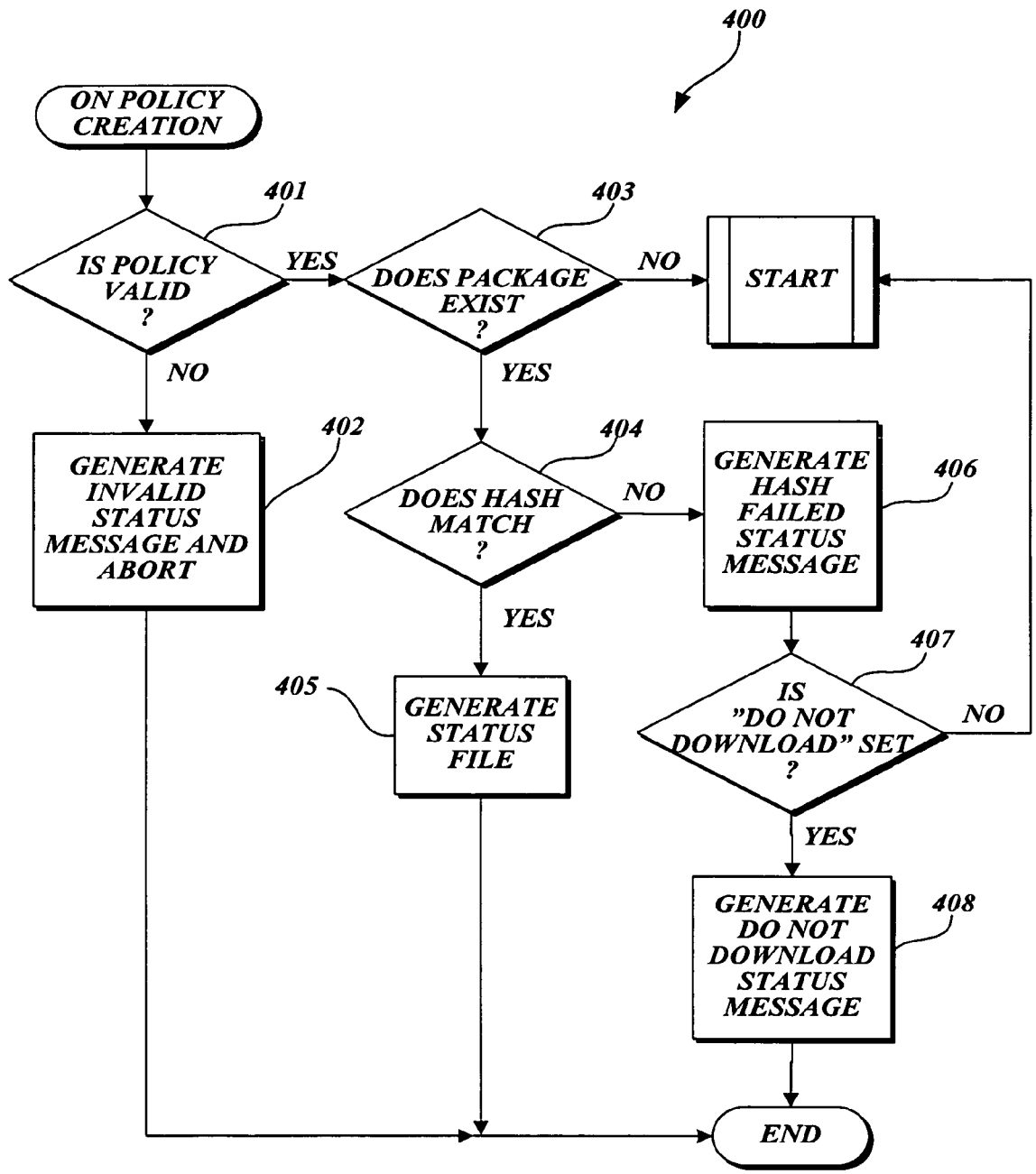
FIG. 4 is a functional flowchart illustrating exemplary actions taken to check if a PDP package download policy is pre-staged.

FIG. 4 is a functional flowchart 400 illustrating exemplary actions taken to check if a PDP package download policy has been pre-staged. A policy (and hence the package associated with the policy) is pre-staged when an administrator at the location of the PDP agent decides that the software application package that constitutes the software application is too big to download using conventional network connections. A package that is pre-staged is a package that is "burnt" on a CD, DVD, or similar storage device. The CD, DVD, or similar storage device is sent to an administrator who downloads the software application package onto the PDP agent. Since the other clients are networked to the PDP agent, the other clients can download the software application package, as explained above, from the PDP agent more efficiently using the bandwidth of the network than if the software application were downloaded from another source If the package is pre-staged, a "Do Not Download" flag is set on the policy sent to the PDP agent by the Distributing server in order to notify the PDP agent that the software application package should not be "pulled" as a "burnt" copy of the software application package is being sent to the administrator to download onto the PDP agent.

Returning to FIG. 4, at block 401 a check is made by the software application suite on the PDP agent to determine if the PDP package download policy received from the Distributing server is valid. A PDP package download policy is valid if the policy is for a software application package that is ready to be electronically distributed to a plurality of destinations. If the policy is not valid (the "NO" branch from block 401), at block 402, an "invalid" status message is generated, and the software application package pull operation is aborted. If the policy is valid (the "YES" branch from block 401), at block 403 another check is made to determine if the software application package for which the policy is created exists on the PDP agent. If the software application package does not exist (the "NO" branch from block 403), the flow goes to the START state (see FIGS. 5, 6A, and 6B and the following description thereof) to begin pulling of the software application package. If the software application package exists (the "YES" branch from block 403), at block 404 another check is made to determine if the hash of the software application package on the PDP agent matches the hash of the software application package on the policy. If the hash of the software application package on the PDP agent matches the hash of the software application package on the policy (the "YES" branch from block 404), at block 405, an appropriate status file is generated. If the hash of the software application package on the PDP agent does not match the hash of the software application package on the policy (the "NO" branch from block 404), at block 406, a "hash failed" status message is generated. Next, at block 407, another check is made to determine if the "Do Not Download" flag is set (in other words, the check determines if the software application package has been pre-staged). If the "Do Not Download" flag is set (the "YES" branch from block 407), at block 408, a "do not download" status message is generated, and the flow ends. If the "Do Not Download" flag is not set (the "NO" branch from block 407), the flow goes to the START state (illustrated in FIGS. 5, 6A, and 6B and described below).

Figure 5:
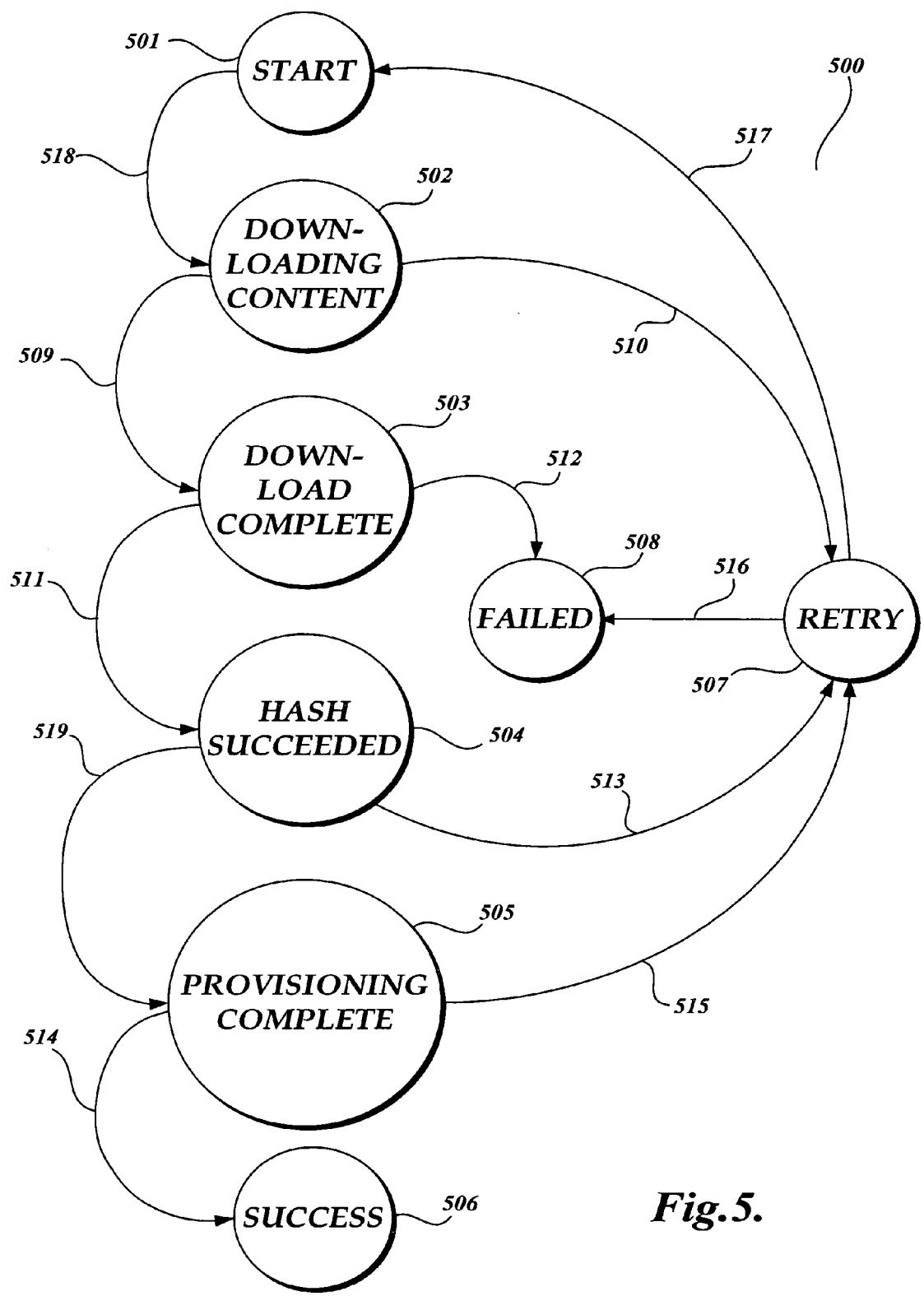

FIG. 5 is a state diagram 500 illustrating exemplary states (stages) that a PDP job goes through. A PDP job represents a single job on a software application package. Each software application package that is targeted to a PDP agent can have at most one PDP job at any time. Any changes to the PDP job (and therefore to the software application package) are serialized by the software application suite on the PDP agent. The PDP job starts at Block 501, which is the START state. In order to advance to the next state, i.e., block 502, which is the DOWNLOADING CONTENT state, the PDP agent sets up a temporary directory and starts pulling the software application package from the Distributing server (path 518).

Depending on the results of pulling the contents of the software application package, the PDP job takes one of two paths, i.e., either path 509 or path 510, from block 502. The PDP job takes path 509 from block 502 if a "download complete notification" (also known as a Content Transfer Manager job) is received by the PDP agent from the Content Transfer Manager (CTM) on the Distributing server. Taking path 509, the PDP job advances to the next state, i.e., block 503, which is the DOWNLOAD COMPLETE state. The PDP job takes path 510 from block 502 if a "download/location error" notification is received by the PDP agent from the Content Transfer Manager on the Distributing server. Taking path 510, the PDP job advances to the next state, i.e., block 507, which is the RETRY state.

Depending on the results of block 503, the PDP job takes one of two paths, i.e., either path 511 or path 512. The PDP job takes path 511 if the hash of the software application package on the PDP agent matches the hash of the software application package on the plurality of policies of the software application package (success at block 404, in FIG. 4 above). Taking path 511, the PDP job advances to the next state, i.e., block 504, which is the HASH SUCCEEDED state. The PDP job takes path 512 if the hash of the software application package on the PDP agent does not match the hash of the software application package on the plurality of policies of the software application package (failure at block 404, in FIG. 4 above). Taking path 512, the PDP job advances to the next state, i.e., block 508, which is the FAILED state.

Depending on the number of retries, the PDP job takes one of two paths, i.e., path 516 or path 517, from block 507. The PDP job takes path 516 if the maximum number of retries has been reached. The maximum number of retries is set by an administrator at the location of the PDP agent. Taking path 516, the PDP job advances to the next state, i.e., block 508, which is the FAILED state. The PDP job takes path 517 if the maximum number of retries has not been reached. Taking path 517, the PDP job goes back to block 501, i.e., the START state.

Depending on the success of the hash, the PDP job takes one of two paths, i.e., path 513 or path 519, from block 504. The PDP job takes path 513 if the setup of a provisioning directory failed after the hash succeeded. Taking path 513, the PDP job advances to block 507, i.e., the RETRY state. The PDP job takes path 519 if the setup of the provisioning directory, and the setup of the Access Control Lists (ACLs) are successful, and the contents of the software application package are moved successfully from the temporary directory created by the PDP agent in order to advance from the START state to the DOWNLOADING CONTENT state. Taking path 519, the PDP job advances to the next state, i.e., block 505, which is the PROVISIONING COMPLETE state.

Depending on the success of completing the provisioning of the software application package, the PDP job takes one of two paths, i.e., path 514 or path 515, from block 505. The PDP takes path 514 if the provisioning of the software application package is successful and the Status (STA) file is sent from the PDP agent to the Distributing server. Taking path 514, the PDP job advances to block 506, i.e., the SUCCESS state. The PDP job takes path 515 if the PDP agent fails to send the STA file to the Distributing server even though the provisioning of the software application package is complete. Taking path 515, the PDA job advances to block 507, i.e., the RETRY state. Once the PDP job reaches block 506, i.e., the SUCCESS state, the software application package is successfully "pulled" from the Distributing server. The software application package is now ready for the other clients connected to the PDP agent via a network connection to pull.

Figures 7, 8:
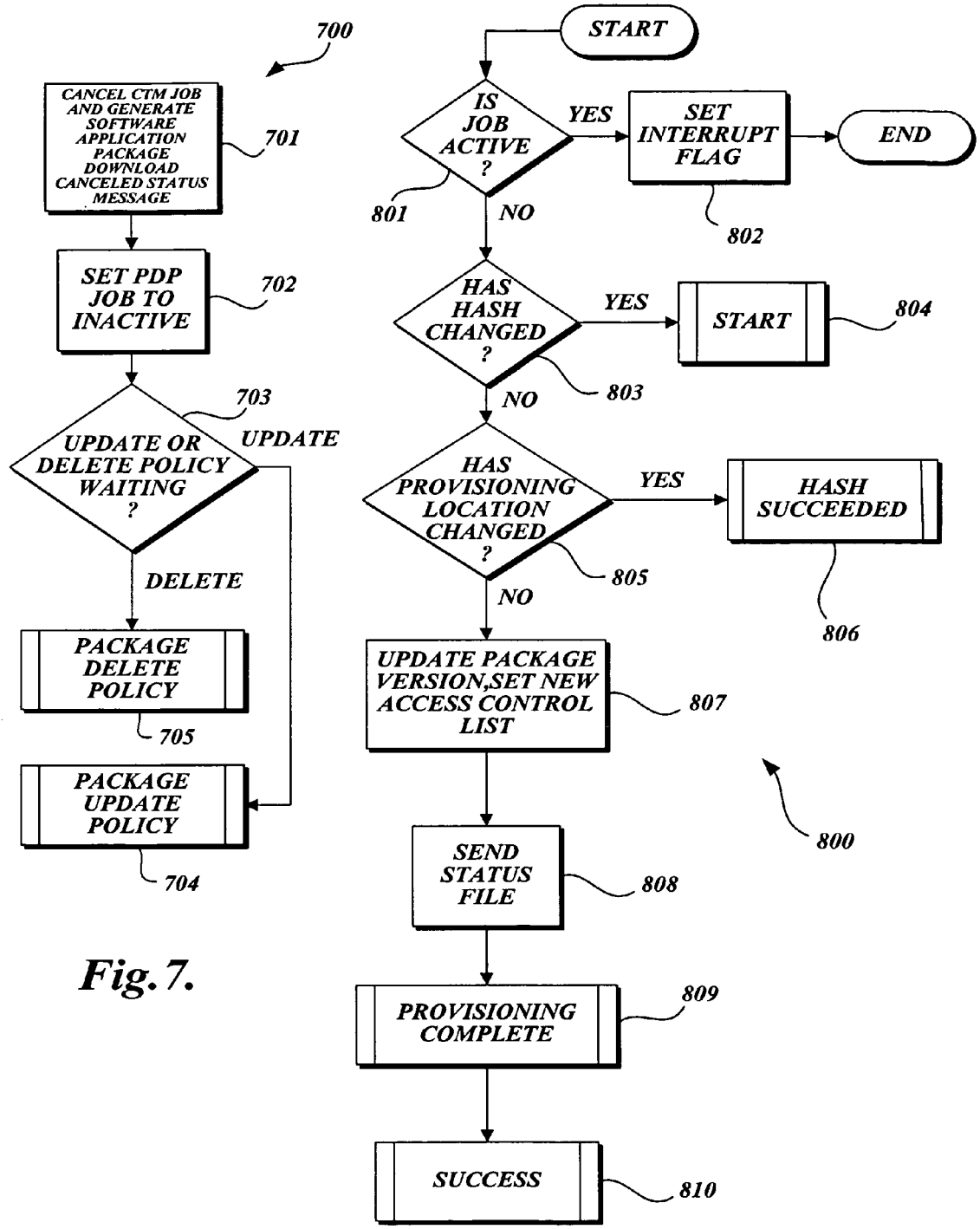
FIG. 7 is a functional flowchart illustrating exemplary actions taken when an interrupt flag is invoked at the beginning of every state.
FIG. 8 is a functional flowchart illustrating exemplary actions taken when a package update policy is invoked.

At the beginning of every state discussed above, an interrupt flag is checked by the software application suite on the PDP agent. FIG. 7 is a functional flowchart illustrating an exemplary scenario 700 of the actions taken when the interrupt flag is invoked at the beginning of every state discussed in FIG. 5 above. At block 701, the CTM job is canceled and a "software application package download canceled" status message is generated. Next, at block 702, the PDP job is set to inactive. Next, at block 703, a check is made to determine whether the plurality of policies of the software application package waiting to be downloaded is for an update of the software application package (Package Update Policy) or for the deletion of the software application package (Package Delete Policy). If the policy is an update policy (arrow marked "Update" from block 703), at block 704, the Package Update Policy is invoked (see FIG. 8 and the hereafter description thereof). If the policy is an delete policy (arrow marked "Delete" from block 703), at block 705, the Package Delete Policy is invoked (see FIG. 9 and the hereafter description thereof).

Figure 6A:
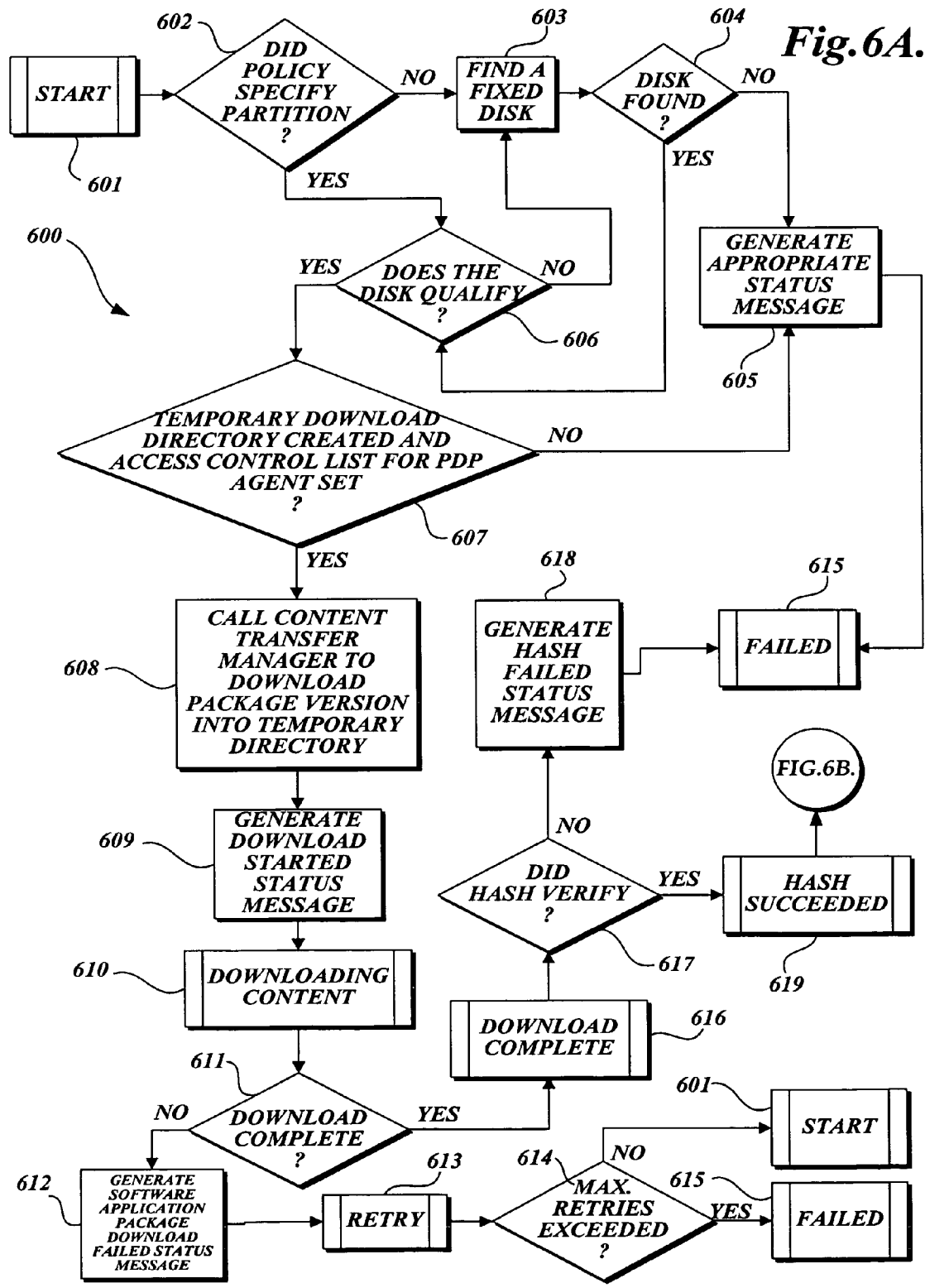
FIGS. 6A and 6B are functional flowcharts illustrating exemplary actions taken by a PDP job going through the states illustrated in FIG. 5.
Figure 6B:
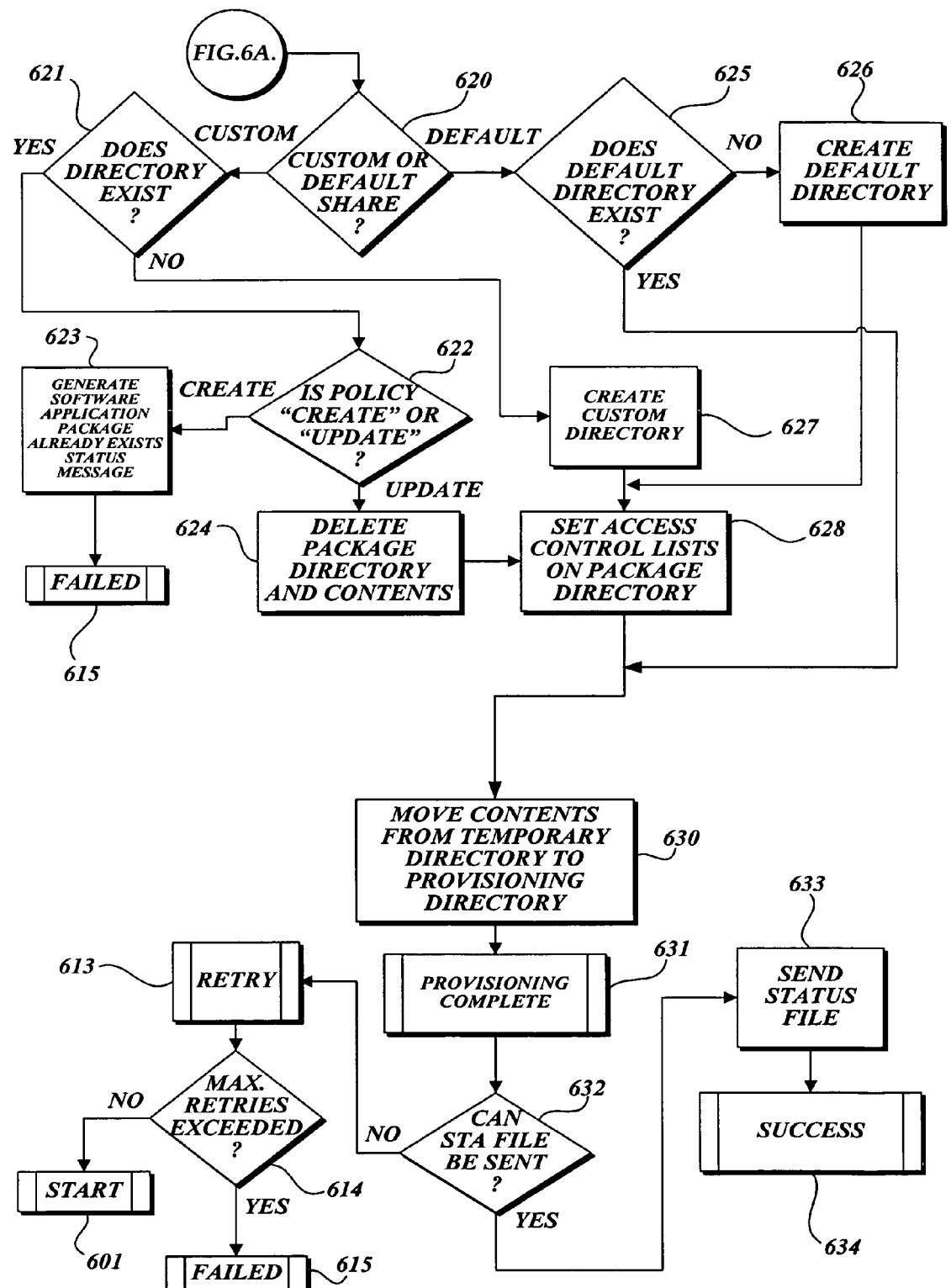

FIGS. 6A and 6B are functional flowcharts 600 illustrating exemplary actions taken by a PDP job going from the START state to either the FAILED state or the SUCCESS state as shown in the state diagram of FIG. 5. The functional flow 600 begins at block 601, which is the START state (block 501 in FIG. 5). At block 602, a check is made to determine if the package download policy specifies a partition of the disk on the PDP agent where the software application package contents are to be downloaded. If no partition is specified (the "NO" branch from block 602), at block 603, the PDP job tries to find a fixed partition disk on the PDP agent to download the software application package. Next, at block 604, a check is made to determine if the disk is found. If no disk is found (the "NO" branch from block 604), at block 605, an appropriate status message is generated. Appropriate status messages are "not enough disk space", "no New Technology File System (NTFS) partition found", "unable to create directory", and "unable to Access Control Lists (ACLs)". Next, the PDP job goes to block 615, which is the FAILED state (block 508 in FIG. 5).

If a partition is specified (the "YES" branch from block 602), or if the disk is found (the "YES" branch from block 604), at block 606, a check is made to determine if the PDP agent disk where the software application package has to be downloaded qualifies for a partition. If the disk found does not qualify for a partition (the "NO" branch from block 606), the flow goes to block 603. If the disk found qualifies for a partition, at block 607, a check is made to determine if a temporary directory is created, and if the ACLs for the PDP agent are set. If either the temporary download directory is not created, or the ACLs for the PDP agent are not set (the "NO" branch from block 606), the flow goes to block 605 and an appropriate status message is generated. If the temporary download directory is created, or the ACLs for the PDP agent are set (the "YES" branch from block 607), at block 608, the Content Transfer Manager (CTM) on the Distributing server is activated to download the software application package into the temporary directory.

Next, at block 609, a "download started" status message is generated by the PDP agent. Next, the PDP job goes to block 610, which is the DOWNLOADING CONTENT state (block 502 in FIG. 5). Next, at block 611, a check is made to determine if the download is complete. If the download is complete (the "YES" branch from block 611), the PDP job goes to block 616, which is the DOWNLOAD COMPLETE state (block 503 in FIG. 5). Next, at block 617, a check is made to determine if the hash of the software application package on the PDP agent matches the hash of the software application package included in the plurality of associated software application package policies. If the hash matches (the "YES" branch from block 617), the PDP job goes to block 619, which is the HASH SUCCEEDED state (block 504 in FIG. 5). If the hash does not match (the "NO" branch from block 617), at block 618, a "hash failed" status message is generated, and the PDP job proceeds to block 615, which is the FAILED state (block 509 in FIG. 5).

If the download is not successful (the "NO" branch from block 611), at block 612, a "software application download failed" status message is generated, and the PDP job proceeds to block 613, which is the RETRY state (block 507 in FIG. 5). Next, at block 614, a check is made to determine if the maximum number of retries has been exceeded. As mentioned above, the maximum number of retries is set by an administrator. If the maximum number of retries has not been exceeded (the "NO" branch from block 614), the PDP job returns to block 601, which is the START state (block 501 in FIG. 5). If the maximum number of retries has been exceeded (the "YES" branch from block 614), the PDP job proceeds to block 615, which is the FAILED state (block 509 in FIG. 5).

Referring to FIG. 6B, after the PDP job enters the HASH SUCCEEDED state (block 619 in FIG. 6A), a check is made at block 620 to determine if the directory where the software application package is to be downloaded is a custom or a default directory. If the directory is a custom directory (the arrow marked "CUSTOM" from block 620), at block 621, a check is made to determine if the custom directory exists. If the directory is a default directory (the arrow marked "DEFAULT" from block 620), at block 625, a check is made to determine if the default directory exists. If the default directory does not exist (the "NO" branch from block 625), at block 626, a default directory is created and the flow moves to block 628 where the ACLs are set on the package directory. If the default directory exists (the "YES" branch from block 625), the flow proceeds to block 630 where the temporary directory contents are moved to a provisioning directory. If the custom directory does not exist (the "NO" branch from block 621), a custom directory is created at block 627 and the PDP job proceeds to block 628.

If the custom directory exists (the "YES" branch from block 621), a check is made at block 622 to determine the type of policy provided for the software application package to be downloaded. The policy can be either to "create" the software application package, or to "update" an existing software application package. If the policy is to "create" the software application package (the arrow marked "CREATE" from block 622), at block 623, a "software application package already exists" status message is generated, and the PDP job proceeds to block 615, which is the FAILED state (block 509 in FIG. 5). If the policy is to "update" an existing software application package (the arrow marked "UPDATE" from block 622), at block 624, the package directory and its contents are deleted. Next, the PDP job proceeds to block 628.

At block 628, the ACLs are set on the package directory and the PDP job proceeds to block 630. At block 630, the contents of the temporary directory are moved to the provisioning directory, and the PDP job proceeds to block 631, which is the PROVISIONING COMPLETE state (block 505 in FIG. 5).

Next, at block 632, a check is made to determine if the status (STA) file can be sent. If the STA file cannot be sent (the "NO" branch from block 632), the PDP job proceeds to block 613, which is the RETRY state (block 507 in FIG. 5). Next, at block 614, a check is made to determine if the maximum number of retries has been exceeded. As mentioned above, the maximum number of retries is set by an administrator. If the maximum number of retries has not been exceeded (the "NO" branch from block 614), the PDP job returns to block 601, which is the START state (block 501 in FIG. 5). If the maximum number of retries has exceeded (the "YES" branch from block 614), the PDP job proceeds to block 615, which is the FAILED state (block 509 in FIG. 5). If the STA file can be sent (the "YES" branch from block 632), at block 633 the STA file is sent, and the PDP job proceeds to block 634, which is the SUCCESS state (block 506 in FIG. 5).

When a PDP agent receives the package update policy, the PDP agent checks to determine if the software application package is being "actively" worked by an initial policy, a delete policy, or a maintenance task. If the software application package is being "actively" worked by the initial policy, a delete policy, or a maintenance task, the PDP agent sets an interrupt flag to indicate an update is pending. If the software application package is not "actively" worked by the initial policy, a delete policy, or a maintenance task, the flow of control follows the actions illustrated in FIG. 8.

FIG. 8 is a functional flowchart 800 illustrating exemplary actions taken when the package update policy is invoked. At block 801, a check is performed to determine if the PDP job is active. If the PDP job is active (the "YES" branch from block 801), at block 802, the interrupt flag is set and the flow ends. If the PDP job is inactive (the "NO" branch from block 801), at block 803, a check is performed to determine if the hash of the software application package stored by the PDP agent has changed (as mentioned above, one way to check if the hash has changed is by comparing the hash of the software application package stored by the PDP agent with the hash of the software application package included in the plurality of software application package policies). If the hash has changed (the "YES" branch from block 803), the PDP job proceeds to block 804, which is the START state. If the hash has not changed (the "NO" branch from block 803), at block 805, a check is performed to determine if the location on the PDP agent that is provisioning the software application package (provisioning location) has changed. If the provisioning location has changed (the "YES" branch from block 805), the PDP job proceeds to block 806, which is the HASH SUCCESS state. If the provisioning location has not changed (the "NO" branch from block 805), at block 807, the version of the software application package is updated, and new ACLs are set. Next, at block 808, the STA file is sent. Next, the PDP job proceeds to block 809, which is the PROVISIONING COMPLETE state. Finally, the PDP job proceeds to block 810, which is the SUCCESS state.

When a PDP agent receives a package delete policy, the PDP agent checks to determine if the software application package is being "actively" worked by an initial policy, an update policy, or a maintenance task. If the software application package is being "actively" worked by the initial policy, an update policy, or a maintenance task, the PDP agent sets an interrupt flag to indicate a delete is pending. If the software application package is not "actively" worked by the initial policy, an update policy, or a maintenance task, the flow of control follows the actions illustrated in FIG. 9.

Figure 9:
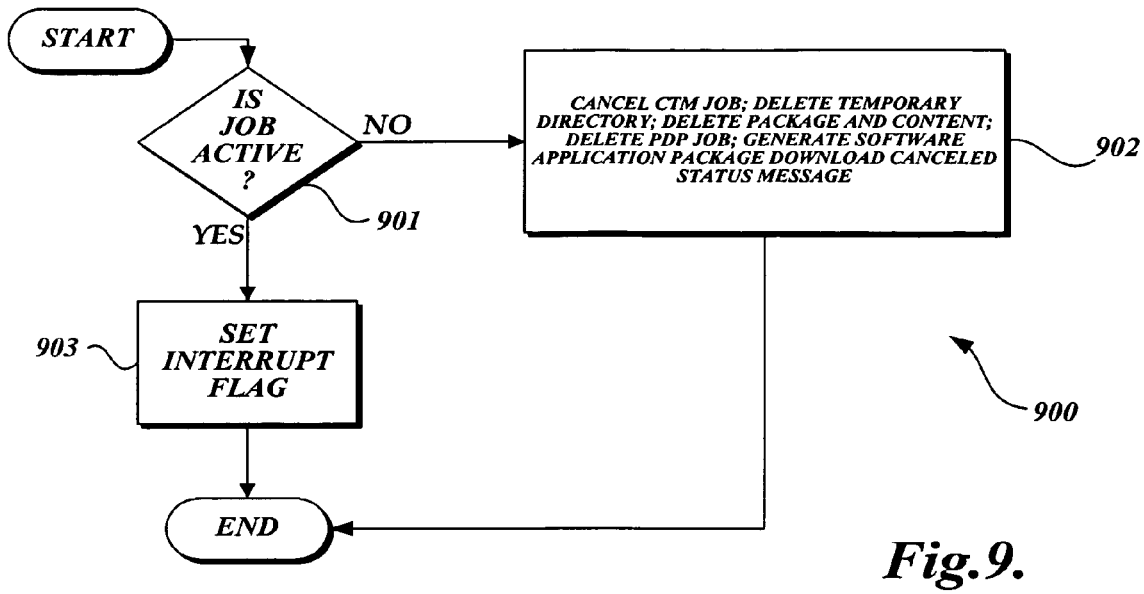
FIG. 9 is a functional flowchart illustrating exemplary actions taken when a package delete policy is invoked.

FIG. 9 is a functional flowchart 900 illustrating exemplary actions taken when a package delete policy is invoked. At block 901, a check is made to determine if the PDP job is active. If the PDP job is inactive (the "NO" branch from block 901), at block 902, the CTM job is canceled, the temporary directory is deleted, the software application package and its content are deleted, the PDP job is deleted, and a "software application package download canceled" status message is generated. If the job is active (the "YES" branch from block 901), at block 903, the interrupt flag is set.

While illustrative embodiments have been illustrated and described, it will be appreciated that various changes can be made therein without departing from the spirit and scope of the invention.

The invention claimed is:

1. A client-server system to distribute software application packages to a plurality of network connected clients with a same network address, comprising:
   a resource server for pushing policies associated with the software application packages to at least one distributing server;
   at least one distributing server for receiving the policies associated with the software application packages from the resource server; and
   a plurality of clients for pulling said policies associated with the software application packages from the at least one distributing server, wherein one of the plurality of network connected clients is designated as a distribution point (PDP agent), wherein:
   (a) the resource server pushes the software application packages associated with policies pushed to the at least one distributing server in response to one of the plurality of network connected clients pulling the policies associated with the software application packages such that the software application packages are not pushed to the at least one distributing server until one of the plurality of network connected clients pulls the policies, wherein the at least one distributing server maintains at least one mapping table that maps the software application packages to the PDP agent and the PDP agent to the resource server;
   (b) the PDP agent pulls the software application packages from the distributing server; and
   (c) the plurality of network connected clients pull the software application packages from the PDP agent.

2. The client-server system of claim 1 wherein the distributing server stores information regarding the PDP agent.

3. The client-server system of claim 1, wherein the distributing server creates:
   (i) a software application package download policy for the PDP agent;
   (ii) a software application package configuration policy for the PDP agent; and
   (iii) a software application package file transfer configuration policy for the PDP agent.

4. The client-server system of claim 3 wherein the distributing server maintains:
   (i) the software application package download policy for the PDP agent;
   (ii) the software application package configuration policy for the PDP agent; and
   (iii) the software application package file transfer configuration policy for the PDP agent.

5. The client-server system of claim 4 wherein the PDP agent manages:
   (i) the software application package download policy on the PDP agent;
   (ii) the software application package configuration policy on the PDP agent; and
   (iii) the software application package file transfer configuration policy on the PDP agent.

6. The client-server system of claim 1 wherein the distributing server creates a provisioning request for the PDP agent.

7. The client-server system of claim 6 wherein the distributing server relays the provisioning request for the PDP agent to the distributing server.

8. A method of distributing software application packages from a resource server to a plurality of network connected clients having a same network address, comprising:
   pushing by the resource server policies associated with the software application packages to a distributing server;
   pulling by clients included in the plurality of network connected clients from the distributing server the policies associated with the software application packages, wherein one of the plurality of network connected clients is designated as a distribution point (PDP agent);

pushing by the resource server a software application package to the distributing server in response to a client included in the plurality of network connected clients pulling the policies associated with the software application packages such that the software application packages are not pushed to the distributing server until one of the plurality of network connected clients pulls the policies, wherein the distributing server maintains at least one mapping table that maps the software application packages to the PDP agent and the PDP agent to the resource server;

pulling by the PDP agent the software application packages from the distributing server; and pulling by other clients included in the plurality of network connected clients the software application packages from the PDP agent.

9. The method of claim 8 wherein the distributing server stores information regarding the PDP agent.

10. The method of claim 8 wherein the distributing server creates:

(i) a software application package download policy for the PDP agent;

(ii) a software application package configuration policy for the PDP agent; and (iii) a software application package file transfer configuration policy for the PDP agent.

11. The method of claim 10 wherein the software application package download policy, the software application package configuration policy, and the software application package file transfer configuration policy are maintained by the distributing server for the PDP agent.

12. The method of claim 11 wherein the PDP agent manages the software application package file transfer configuration policy on the PDP agent.

13. The method of claim 11 wherein the PDP agent manages the software application package configuration policy on the PDP agent.

14. The method of claim 11 wherein the PDP agent manages the software application package download policy on the PDP agent.

15. The method of claim 8 wherein the distributing server creates a provisioning request for the PDP agent.

16. The method of claim 15 wherein the distributing server relays the provisioning request for the PDP agent to the distributing server.

* * * * *